United States Patent
Jones

(10) Patent No.: US 11,620,432 B2
(45) Date of Patent: *Apr. 4, 2023

(54) SYSTEM AND METHOD FOR AGGREGATING LEGAL ORDERS

(71) Applicant: JPMorgan Chase Bank, N.A., New York, NY (US)

(72) Inventor: Clinton Michael Jones, Columbus, OH (US)

(73) Assignee: JPMORGAN CHASE BANK, N.A, New York, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 17/022,226

(22) Filed: Sep. 16, 2020

(65) Prior Publication Data

US 2021/0004521 A1  Jan. 7, 2021

Related U.S. Application Data

(63) Continuation of application No. 16/241,548, filed on Jan. 7, 2019, now Pat. No. 10,810,350.

(Continued)

(51) Int. Cl.
*G06F 40/103* (2020.01)
*H04L 9/32* (2006.01)
(Continued)

(52) U.S. Cl.
CPC .......... *G06F 40/103* (2020.01); *G06F 3/0482* (2013.01); *G06F 16/84* (2019.01);
(Continued)

(58) Field of Classification Search
None
See application file for complete search history.

(56) References Cited

U.S. PATENT DOCUMENTS 6,553,099 B1  4/2003  Gundlach
7,016,963 B1  3/2006  Judd
(Continued)

FOREIGN PATENT DOCUMENTS

FR        2796180 A1 *  1/2001  ............. G06Q 10/10
WO  WO-2004061619 A2 *  7/2004  ............. G06Q 10/10

OTHER PUBLICATIONS

Messick, "Service of Process, 2.0," Digital Media Law Project, http://www.dmlp.org/print/12269, Jul. 26, 2012.

(Continued)

*Primary Examiner* — Uyen T Le
(74) *Attorney, Agent, or Firm* — Greenblum & Bernstein, P.L.C.

(57) ABSTRACT

Systems and methods for generating and aggregating electronic versions of legal documents are provided. The generated documents may be made available to receiving parties for additional input or processing. In some embodiments, documents are made available in compliance with statutory or regulatory requirements regarding the proper service of the documents. The electronic documents may be converted to a standardized format or may be formatted for distribution to the document recipients according to the needs of each recipient. The system and method may collect and aggregate the electronic documents so as to provide them to the document recipients in a batch format to allow for more efficient distribution and processing.

20 Claims, 5 Drawing Sheets

Related U.S. Application Data

(60) Provisional application No. 62/614,084, filed on Jan. 5, 2018.

(51) Int. Cl.

| | | |
|---|---|---|
| *G06Q 50/18* | (2012.01) |
| *G06F 16/84* | (2019.01) |
| *G06Q 10/10* | (2012.01) |
| *G06F 3/0482* | (2013.01) |
| *G06F 40/197* | (2020.01) |
| *G06F 16/93* | (2019.01) |

(52) U.S. Cl.
CPC ............ *G06F 16/93* (2019.01); *G06F 40/197* (2020.01); *G06Q 10/10* (2013.01); *G06Q 50/18* (2013.01); *H04L 9/3247* (2013.01)

(56) References Cited

U.S. PATENT DOCUMENTS

| | | | |
|---|---|---|---|
| 7,484,170 B2* | 1/2009 | Collet | ...................... G06F 40/18 |
| | | | 715/250 |
| 8,412,628 B2 | 4/2013 | Beach | |
| 9,299,069 B2 | 3/2016 | Felse | |
| 9,665,737 B2* | 5/2017 | Petrogiannis | ........... G06F 21/30 |
| 9,916,615 B2 | 3/2018 | Bertrand | |
| 2002/0198815 A1 | 12/2002 | Greifeld | |
| 2005/0039018 A1 | 2/2005 | Wittkotter | |
| 2006/0206622 A1* | 9/2006 | Noble | ................... G06F 16/258 |
| | | | 707/999.2 |
| 2007/0055938 A1 | 3/2007 | Herring | |
| 2008/0276158 A1 | 11/2008 | Lim | |
| 2009/0083328 A1 | 3/2009 | Vivona | |
| 2011/0072052 A1 | 3/2011 | Skarin | |
| 2013/0117400 A1 | 5/2013 | An | |
| 2014/0108274 A1 | 4/2014 | Sherfey | |
| 2014/0214423 A1 | 7/2014 | Camargo | |
| 2015/0010216 A1 | 1/2015 | Papastefanou | |
| 2016/0019631 A1 | 1/2016 | Guha | |
| 2017/0124631 A1 | 5/2017 | Bhandari | |
| 2018/0205546 A1 | 7/2018 | Haque | |
| 2018/0262335 A1 | 9/2018 | Bergner | |
| 2019/0361860 A1 | 11/2019 | Rogynskyy | |

OTHER PUBLICATIONS

ServeNowEDU, "The State of eService," https://www.serve-now.com/articles/2193/electronic-service-of-process-edu, Apr. 28, 2016.

* cited by examiner

SYSTEM AND METHOD FOR AGGREGATING LEGAL ORDERS

CROSS-REFERENCE TO RELATED APPLICATIONS

This is a continuation application of U.S. patent application Ser. No. 16/241,548, filed Jan. 7, 2019, which claims the benefit of U.S. Provisional Application No. 62/614,084, filed on Jan. 5, 2018. The entire disclosure of each of the above-identified applications, including the specification, drawings, and claims, is incorporated herein by reference in its entirety.

TECHNICAL FIELD

The present disclosure relates generally to systems and methods for generating, aggregating, distributing, and responding to legal orders.

BACKGROUND

Banks and other financial institutions are frequently required to perform certain actions affecting customer accounts at the request or order of various third parties. For example, such actions may be ordered by courts, various enforcement agencies, and/or law firms. The known methods of generating, transmitting, receiving, and processing these orders and other legal documents are labor-intensive and can involve the manual input of data on both the part of the issuer and the recipient of the order. Often there are multiple recipients, with various requirements regarding the receipt and processing of such orders. Adding to the complexity of the process, the transmittal of certain orders must comply with burdensome regulatory, statutory, or other restrictions. For example, under certain service of process rules, each recipient of an order must be verified and receipt of an order confirmed. As not all receiving institutions use compatible systems, a sender may generate orders that do not conform to each institution's requirements for order processing. Alternatively, the receiving institution may be required to convert incompatible orders to conform to its own processing requirements.

These and other shortfalls in known systems lead to inefficiencies resulting from the manual creation of an order at each receiving party to ensure proper service of the order. Not only does this add to the cost of preparing and processing these types of orders, but it also can introduce delay and the potential for error in the process. It is therefore appreciated that a need exists for systems and methods for generating and aggregating legal orders such as court orders, levies, garnishments, subpoenas, or similar documents enabling enforcement agencies, law firms, and similar entities to generate official orders, and once created, efficiently provide those orders to entities such as banks and other financial entities for processing, compliance, or other actions.

SUMMARY

In an exemplary embodiment, a system receives input from a user at the enforcement agency which comprises the various pieces of information required to generate an electronic version of a legal document. Certain of this information is required by statute in order to be valid and enforceable. Portions of the required information can be in the form of a document template or other pre-populated information source. Other pieces of information can be entered by the user or, in certain exemplary embodiments, may be automatically extracted from various data sources available to the user or organization with which the user is affiliated. When the document has been populated by the user, certain exemplary embodiments may provide the user with an opportunity to select the institutions which are to receive or otherwise have access to the generated document. The generated document and documents may then be transmitted to a centralized database.

In some exemplary embodiments, the documents are then provided to the selected receiving institutions in a preselected format. The preselected format can be a standardized format that can be interpreted by computer systems in place at a receiving institution or directly by receiving institution personnel. Such formats may comprise manual input of document information, optical character recognition (OCR) and/or various electronic document formats. In such embodiments, the standardized format can be further interpreted and parsed by the receiving institution's computer systems.

In certain embodiments, interpretation and parsing of a standardized format can be performed prior to transmission to the receiving institution. Thus, the requirements of the receiving system are predetermined and used by the exemplary embodiment to create electronic files for consumption by systems at the receiving institution.

In some exemplary embodiments, the documents created by a user are aggregated with documents created by that user and others such that the documents can be provided in an electronic batch to one or more receiving institutions.

The above and other aspects and advantages of the present disclosure will become more readily apparent from the following description and figures, illustrating by way of example the principles of the concepts of the disclosure.

BRIEF DESCRIPTION OF THE DRAWINGS

These and other features of the present disclosure will become better understood with regard to the following description and accompanying drawings in which.

DETAILED DESCRIPTION

This detailed description merely describes exemplary embodiments of the present disclosure and is not intended to limit the scope of the disclosure in any way to the embodiments described herein. Indeed, the disclosed concepts are broader than the exemplary embodiments.

Figure 1:
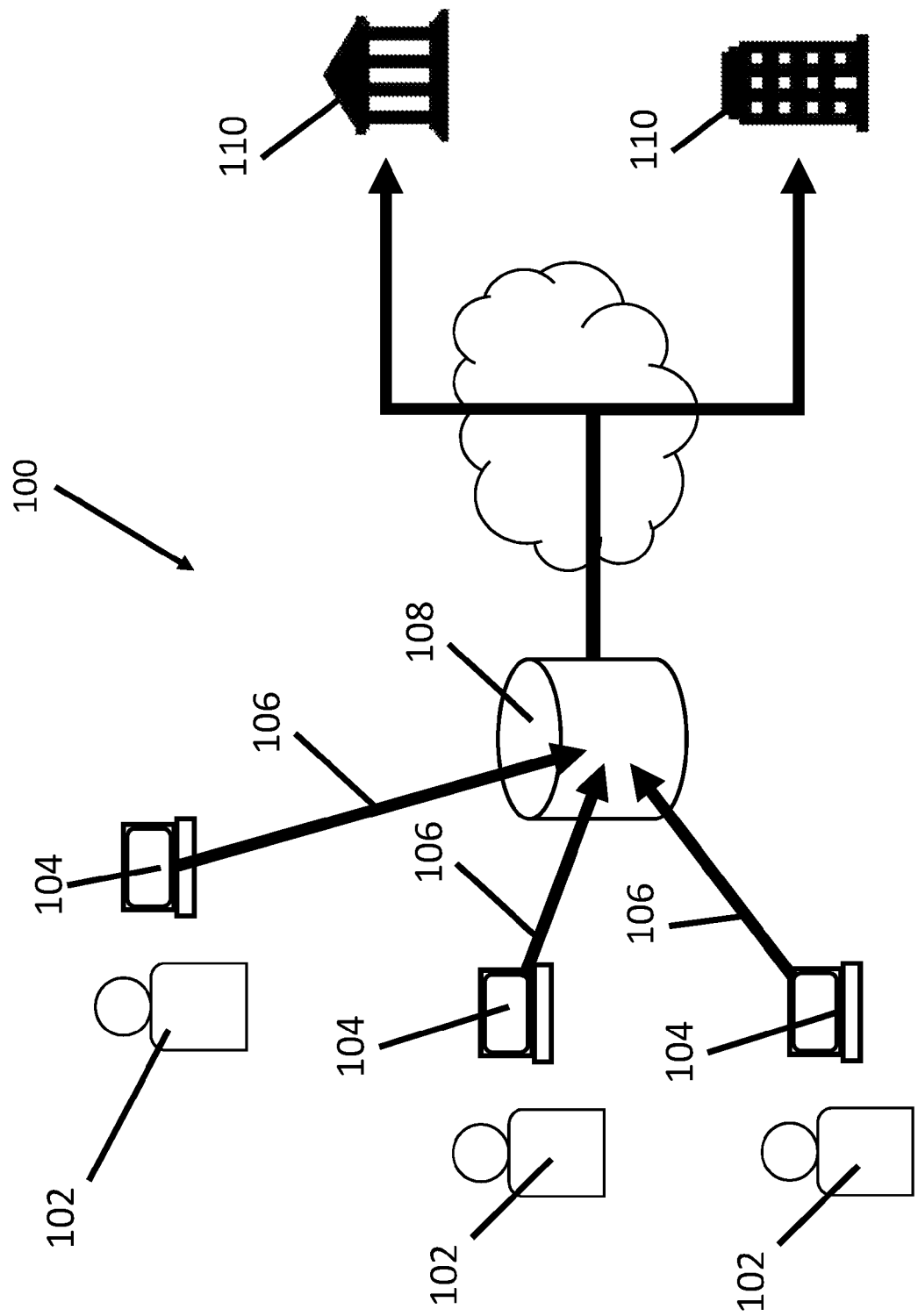
FIG. 1 is a diagram illustrating an exemplary order aggregation system.

FIG. 1 illustrates a diagram of an exemplary order aggregation system 100. As illustrated, a plurality of users 102 may enter document information into computing devices 104. It will be further appreciated that computing devices 104 may comprise one or more desktop or laptop computers, tablets, smartphones, or the like. Computing devices 104 may accept user input via an input device, such as a physical or virtual keyboard, mouse, touch screen, or the like. Computing devices 104 may further be attached or otherwise associated with a display for displaying user input or other information at the computing devices 104. Computing devices 104 may further comprise or be associated with peripheral devices such as a scanner or similar optical input device. In some embodiments, information or documents relating to an order to be generated at computing devices 104 may be input via a scanned document. It will be appreciated that various methods of recognizing such inputs may be utilized with the order aggregation system 100, such as optical character recognition (OCR) or similar technology known to those of skill in the art. In some embodiments, computing devices 104 may be configured to convert handwritten portions of scanned documents to computer readable text. While different configurations of computer hardware and software associated with computing devices 104 are envisioned, computing devices 104 comprise at least a processor in communication with a memory, such that the processor can be configured to execute software instructions stored in the memory. While described as a plurality, it will be appreciated that users 102 and computing devices 104 and their equivalents may be described similarly in singular form, e.g. user 102 and computer device 104, without deviating from the features and functions of the disclosure.

Computing devices 104 may further be configured to communicate with each other or additional systems, such as database 108 and document recipients 110, over a network, such as the Internet, intranet, or the like. In certain exemplary embodiments, the computing device 104, via an associated processor and memory, may execute software that provides an order aggregation user interface for the users 102. In certain embodiments, the software may be a series of instructions embodied on a non-transitory computer readable medium, such as a compact disk, thumb drive, or the like. The software may also be configured to process document information input by the users 102 or input to the computing device via peripheral devices such as a scanner, to generate and modify electronic documents. As used herein, electronic documents may include any digital file suitable to organize and store information and data. It will be appreciated that electronic documents may include additional data, e.g. metadata, that further describes and/or characterizes the information contained within the electronic document. In some embodiments, the software that provides the user interface may reside and be executed on a computer server or other device (not shown) that is located remotely from the computing devices 104 of the users 102. In some embodiments, the user interface may be delivered or implemented via a webpage or electronic portal displayed on the computing devices 104, while the receipt and processing of the document information takes place remotely at a computer server or other device. In some embodiments, the computer devices 104 may access the user interface through an electronic portal or website. In certain embodiments, the electronic portal or website is hosted on, or in communication with, the database 108. Still other embodiments may comprise a mixture of approaches, wherein a software program may be executed on the computing devices 104 but document information is processed at a computer server or other device located remotely from the computing devices 104, e.g. database 108. As illustrated in FIG. 1, electronic documents 106 generated by at computing devices 104 may be provided to a database 108 or similar centralized data repository.

Once received at the database 108, the electronic documents 106 may be transmitted from the database 108 to one or more document recipients 110 as the result of selections made by users 102. Database 108 may aggregate documents associated with a single order or a single document recipient in order to transmit the documents in a batch or similar grouping. In some embodiments, documents may be batched according to characteristics such as the sender, the order type (e.g. levy, court order, subpoena, information subpoena restraining notice (ISRN), etc.), legal entity, or the like. It will be appreciated that additional batching characteristics or combinations of thereof may be used to aggregate documents. In some embodiments, the batching or grouping is done before transmission to the database 108 according to user selections or preferences. In certain embodiments, the selections may be made via a user interface at computing device 104 as referenced above. In other embodiments, the document recipients 110 may access the database 108 through a webpage or portal to retrieve documents or batches of documents that have been identified by users 102 as available to the document recipients 110.

In some embodiments, after receipt and access of the order or document, e.g. electronic documents 106, document recipients 110 may process the orders and send documents or data required by the order back to the court or entity that generated the order, e.g. user 102. In certain embodiments, the document recipients may upload the completed order or required documents and/or data directly to database 108. In some embodiments, document recipients may access database 108 using a website or portal. For example, a user 102 may generate a levy order (e.g. electronic documents 106) at computing system 104 which is sent to document recipients 110 via database 108. The answer to the levy order may be sent back to the sender (e.g. user 102) via database 108. In another example, user 102 may generate a production subpoena which is sent to the document recipients 110 via database 108. The required production materials may then be directly uploaded by the document recipients 110 to database 108 for access by users 102. It will be appreciated, that in certain embodiments, a common user interface (e.g. website or portal) may be used by both the users 102 and the document recipients 110 to send and receive the electronic documents 106 and/or additional documents, data, or information required in order to comply with an order.

In some embodiments, users 102 may determine access rights to the electronic documents 106 stored at database 108 for one or more document recipients 110. In certain embodiments, access rights are pre-determined by the content of the order, wherein the order specifies specific entities or parties of the document recipients 110 that are authorized and/or required to access to the electronic documents 106. Pre-determined information relating to sender or recipient access rights may be stored or retrieved at computing systems 104. Such information may be stored in the form of sender or receiving entity profiles, where a profile may contain information beyond access rights, such as preferred document format, preferred computing systems of the recipient, prior document receipt information, etc. Profiles may also contain pre-determined and static information relating to the recipient entity itself such as address, phone number, etc. In some embodiments, computing systems 104 may access profile information from a remote server. It will be appreciated that profile information may be updated automatically at computing systems 104 or wherever it is stored based on changes in recipient information.

In some situations, the order may require certain parties not only access the electronic documents 106, but additionally verify that they have been received. For example, orders with service of process requirements must be verifiably delivered to a receiving party. Certain access restrictions may be associated with the order as determined by the issuing entity. For instance, certain orders may be sealed, and thus only the receiving entity may access the document. In some embodiments, electronic documents 106 may be automatically transmitted to the one or more document recipients 110 based on information contained within the electronic documents. For instance, the software may recognize that a defendant has several accounts at various financial institutions named in the order that are required to receive the order. The software may then automatically distribute the order to the named financial institutions based on the information processed in electronic documents 106.

Figure 2:
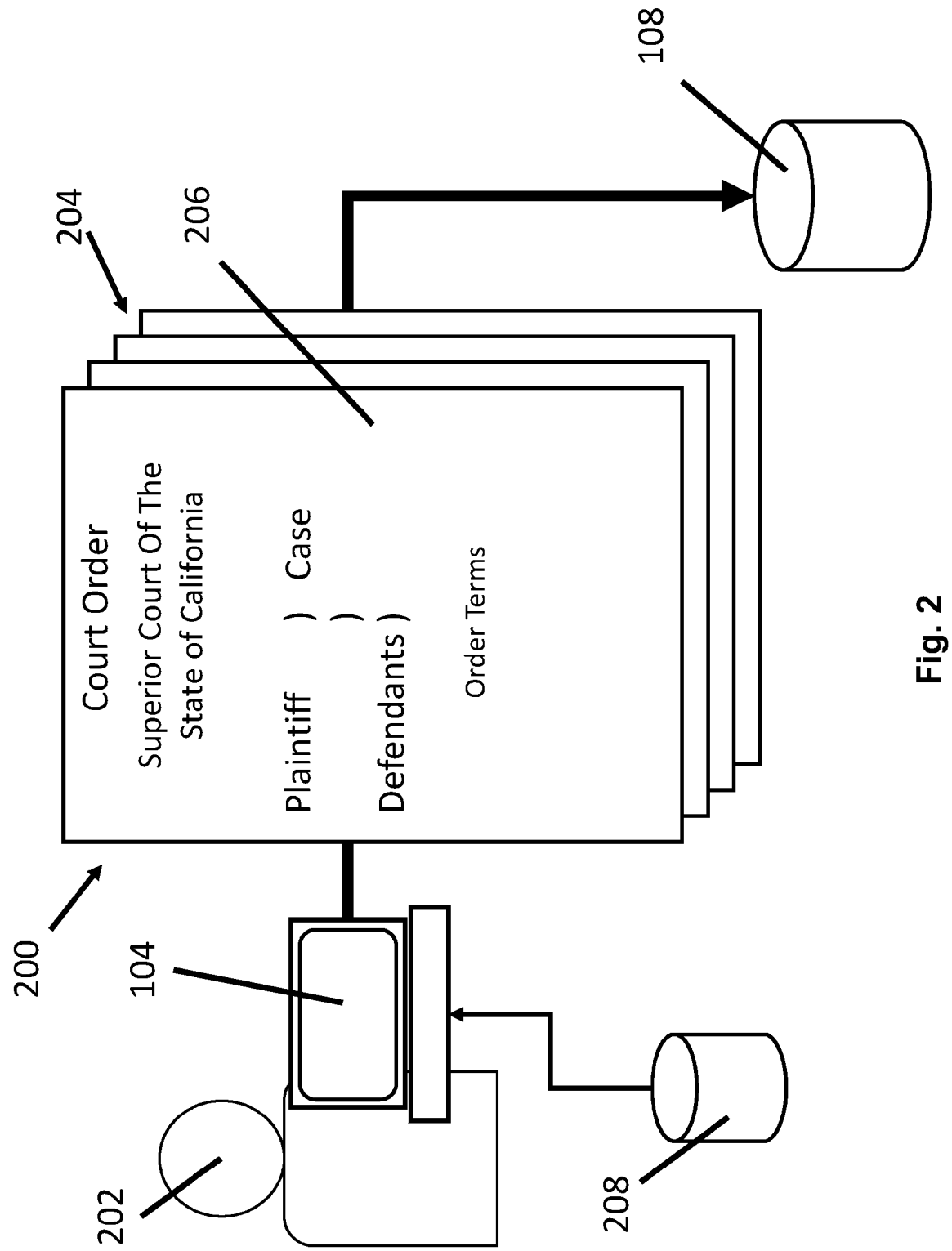
FIG. 2 is a diagram of a user that is entering information into a computerized system to generate court documents according to an exemplary embodiment.

FIG. 2 illustrates the process flow of an exemplary application 200 configured to generate and/or modify electronic versions of court documents 204. The application 200 may be installed and executed on computing device(s) 104. In certain embodiments application 200 may be made accessible to a user, e.g. court officer 202 through a secure connection to an online portal or webpage displayed at computing device(s) 104. As illustrated in FIG. 2, a court officer 202 may enter court order information into application 200 using computing device 104. Each document 204 may have a predefined format that is comprised of sections 206. Sections 206 are related to specific order information, such as that required by court orders, levies, garnishments, subpoenas, etc. As an example, a court order could have a predefined format including information related to which court is issuing the order, the type of order, case number, the name of the plaintiff, the name of the defendant, the terms of the order etc. In some embodiments, sections 206 include only general information serving as a placeholder for more specific information which can be entered by the court officer 202. For example, a predefined format may have a field entitled "ISSUING COURT" which can be replaced or overwritten by the court officer 202 with the appropriate court issuing the order, in this example, the Superior Court of the State of California. Certain of these sections 206 may be pre-populated such that the court officer 202 is not required to manually enter information into those sections. Pre-population of the sections 206 may be accomplished via a connection between the computing device 104 and court databases 208. In some embodiments, pre-population of sections 206 is accomplished through the use of various profiles. Profiles may be linked to the court officer 202, such that information pertaining to the type and content of orders generated by the court officer 202 may be pre-entered into an order. Profiles may also relate to or describe the issuing court or one or more of the recipients.

Court databases 208 may comprise one or more computer servers or similar data repositories configured to store information related to the court documents. In some embodiments the court databases 208 are configured to store historical data related to prior orders such as related documents and/or information regarding receiving parties. Historical data may enable the court databases 208 to organize, aggregate, or otherwise link certain aspects of prior orders for quicker retrieval or additional batching. Certain receiving parties (not shown in FIG. 2) may be required to audit the orders they have received over a certain period of time and thus historical data stored at court databases 208 may be used to deliver information regarding a totality of orders transmitted to and received by a receiving party during a period of time. In some embodiments, historical data may be used to generate, pre-populate fields, or otherwise modify an order at computing device 104.

Some orders stored at the court databases 208 may be redacted or otherwise modified to prevent non-public information from being stored and/or retrieved from the court databases 208. In some embodiments, application 200 is configured to process the entered and/or retrieved information to generate electronic versions of court documents 204 and store those documents into the database 108 for retrieval by or transmission to document recipients 110 (not shown in FIG. 2). In certain embodiments, the nature and content of the orders generated at computing systems 104 may require that the documents 204 not be modified once they are transmitted to database 108. Certain protections may be placed on the documents 204 or certain sections 206 that prevent any further modification after they generated and completed at computing devices 104. In certain embodiments, a unique digital signature may be applied to the document 204 after it has been completed. The digital signature may be analyzed at database 108 or by document recipients in order to verify that the document 204 and its content has not been modified by an unauthorized party. It will be appreciated that, in reference to FIG. 2, court databases 208 and database 108 may comprise one or more servers, databases, or other data repositories in communication with each other. In some embodiments, court databases 208 and database 108 are embodied on the same server or collection of servers.

Figure 3:
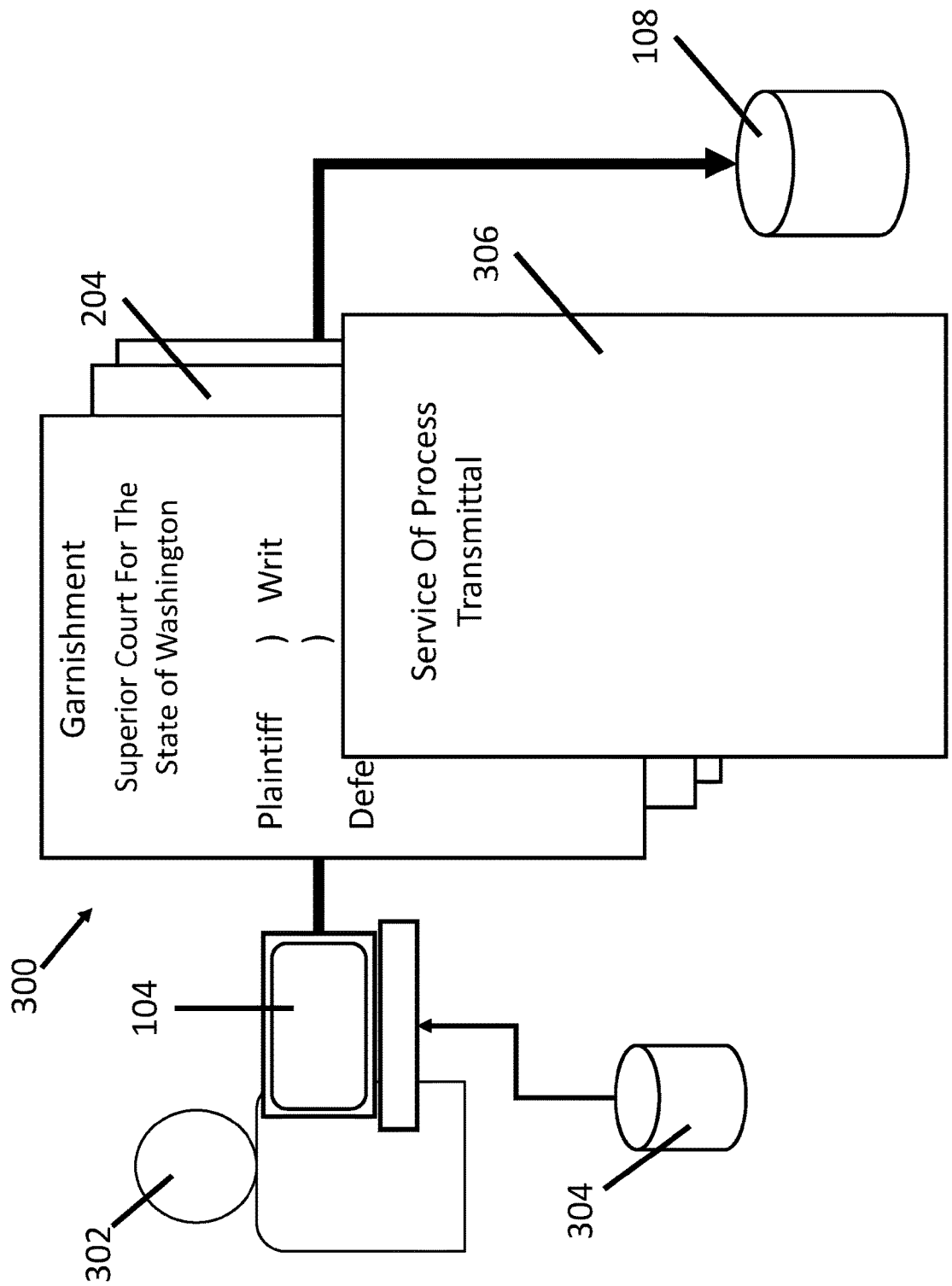
FIG. 3 is a diagram of a user that is entering information into a computerized system to generate notices, transmittals, and other legal documents according to an exemplary embodiment.

FIG. 3 illustrates an exemplary application 300 in which a user, e.g. lawyer 302, clerk, or other person associated with a law firm or other non-court entity interacts with the order aggregation system of the present disclosure, e.g. order aggregation system 100. In such embodiments, lawyer 302 may interact with a computing device 104 to retrieve information from a law firm database 304 which comprises information pertaining to an ongoing legal matter. In such exemplary embodiments, the computing device 104 may also retrieve information from electronic versions of court documents 204 stored in the database 108. The retrieved information may be combined with information entered by the lawyer 302 or may be used alone, to create electronic communications 306 which are stored into the database 108 for retrieval or transmission to document recipients 110 (not shown in FIG. 3).

Figure 4:
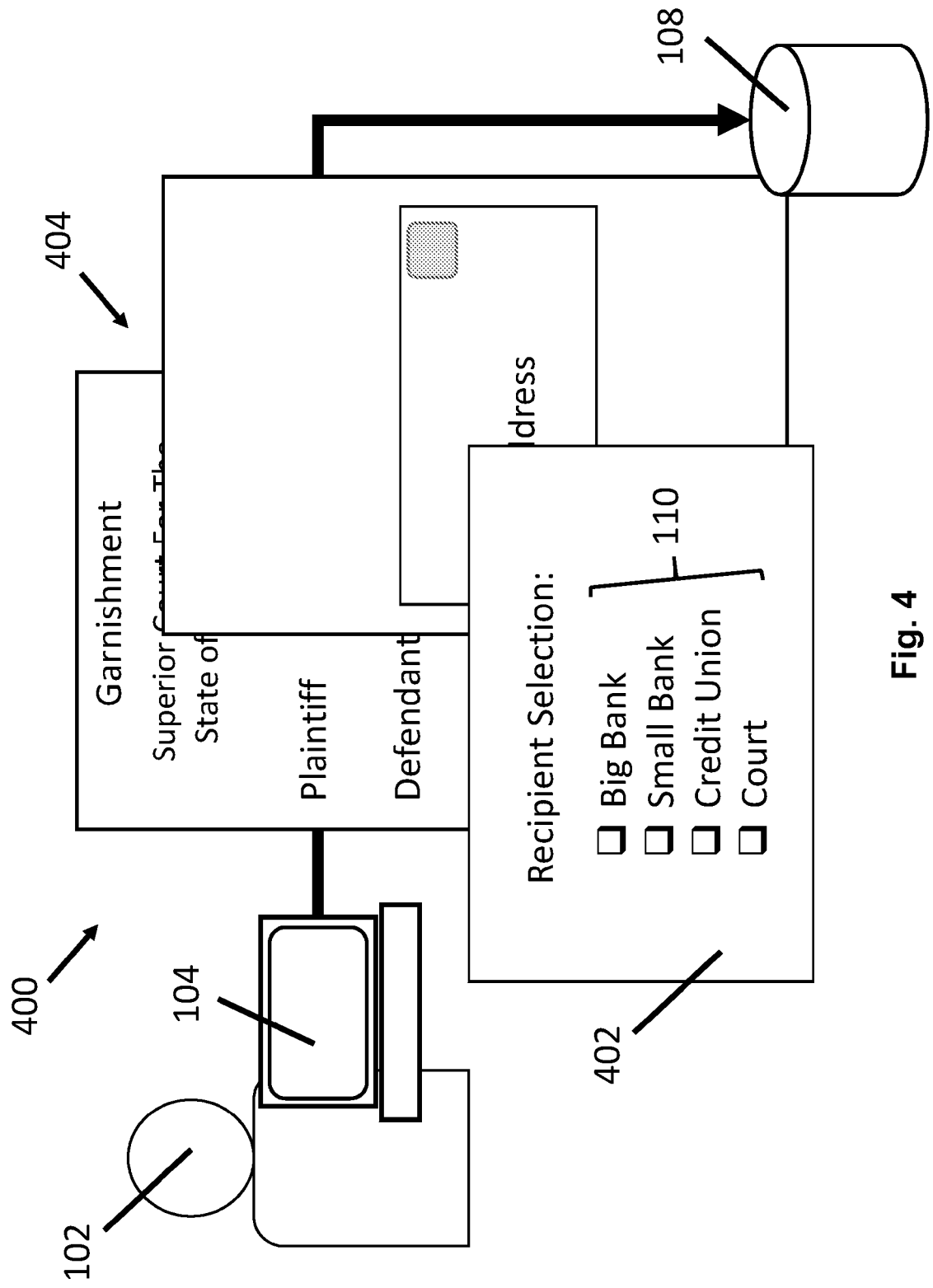
FIG. 4 is a diagram of a user that is entering recipient selection information into a computerized system to identify electronic documents and their associated recipients according to an exemplary embodiment.

In some exemplary embodiments, a user, e.g. user 102, 202, and/or 302 can select document recipients 110 to receive or have access to electronic court documents 204, electronic communications 306, or other electronic documents that are stored in the database 108. As shown in the exemplary application 400 illustrated in FIG. 4, a user 102 may be presented with a user interface 402 that allows the user to select from a list of recipients to receive or have access to the certain electronic documents 404. The selections associated with these electronic documents 404 are stored in the database 108 and used by the system to identify document recipients 110 who are to have access to or be provided with copies of the electronic documents. For example, a user may select Big Bank One, and Small-Town Savings and Loan as requiring access to an electronic document 404, e.g. a garnishment order for Adam Account Holder. This access authorization is then associated with the garnishment order and the association is stored in the database 108. Later, a representative of Small Town Savings and Loan automatically receives or may request documents pertaining to Adam Account Holder. In such an exemplary embodiment, the documents selected by the automated process or representatives request is compared with the with associations stored in the database 108 to determine whether the permission level associated with user 102 is sufficient to permit the requested document to be disclosed to a requested document user. In addition to identifying those recipients, the selections can be used to cause copies of the electronic documents 404 to be formatted in a manner that is usable by the document recipients. For example, certain document recipients may require the electronic documents in a Portable Document Format (PDF), while other document recipients may require the information from the electronic documents in a row and column format. As will be appreciated by those of skill in the art, many different possible document formats may be utilized and thus, this disclosure should not be limited to exemplary PDF and row and column formats.

Figure 5:
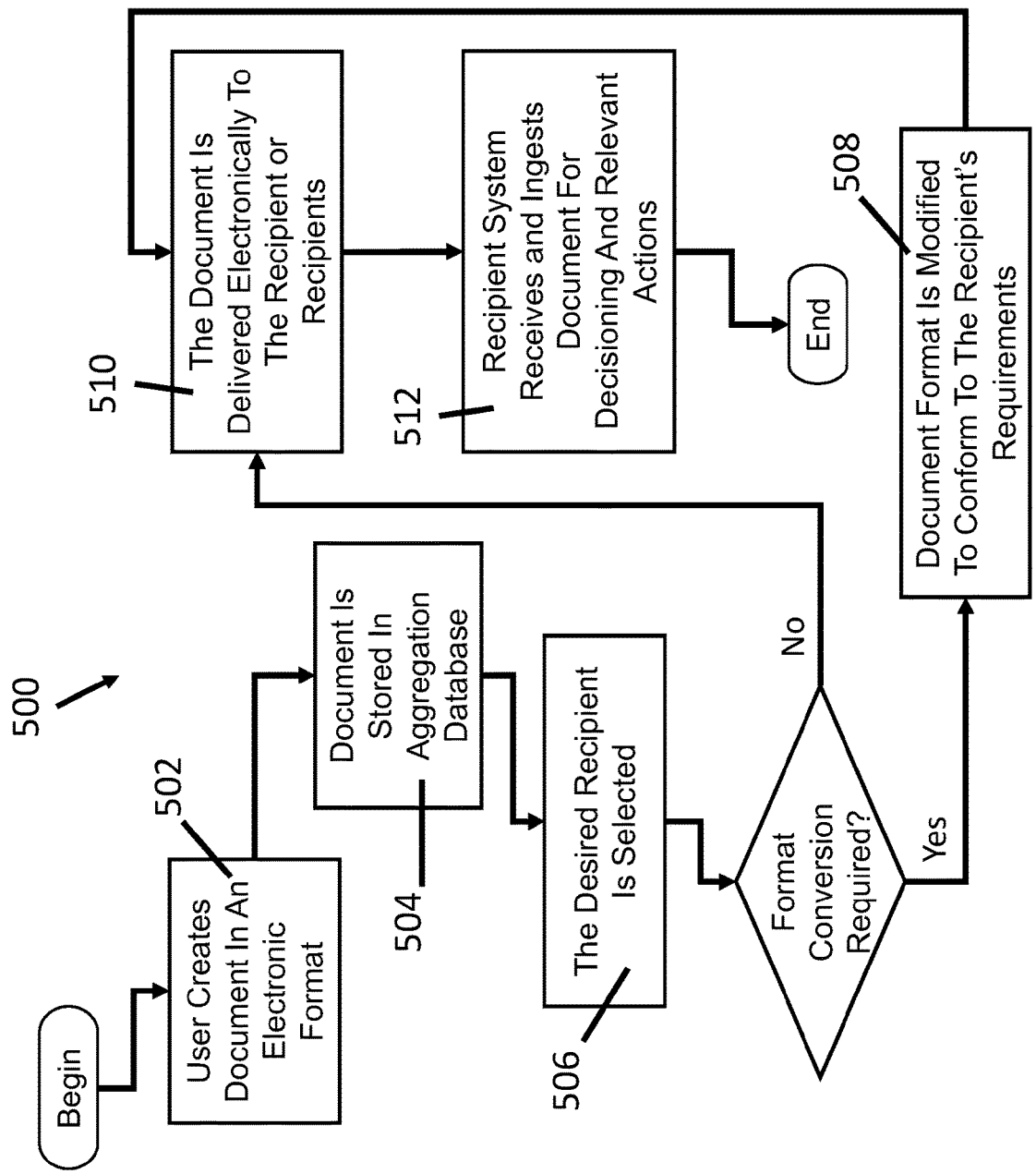
FIG. 5 is a flow chart of the steps taken by an exemplary embodiment.

FIG. 5 illustrates a flow chart of an exemplary method 500 for aggregating legal orders. It will be appreciated that the illustrated method 500 and associated steps may be performed in a different order, with illustrated steps omitted, with additional steps added, or with a combination of reordered, combined, omitted, or additional steps.

In step 502, a user (e.g. user 102, 202, and/or 302), creates a document in an electronic format using a portal or software application as discussed with regard to FIGS. 1-3. In step 504, the document is transmitted to and stored in an aggregation database, e.g. database 108. The document may be aggregated with like documents or orders as determined by the aggregation database. Document or order aggregation may be performed according to a number of factors including, but not limited to, court or jurisdiction, sender, order type (e.g. levy, court order, subpoena, information subpoena restraining notice (ISRN), etc.), receiving party, legal entity, etc. In certain embodiments, the document created at step 502 may be encrypted at the point of creation, e.g. on computing device 104, or may alternatively be transmitted to an intermediary system to perform encryption. If encryption of the document is performed at an intermediary system, the encrypted document may be sent back to the user 102 to transmit to the aggregation database or may be transmitted directly form the intermediary system to the aggregation database. In some exemplary embodiments, desired document recipients 110 are selected by the user in step 506. If that selection indicates that an intended document recipient 110 requires that the document be in a particular format suitable for effective service to a specific recipient, a format conversion is triggered to modify the document in step 508. In some embodiments, the format conversion may alter characteristics of the documents. For example, a document may be converted from a user-editable document (e.g. Microsoft Word® .doc or .docx files) to a non-editable file format (e.g. portable document format .pdf or the like). It will be further appreciated that some format conversions may strip away, delete, or otherwise remove additional data associated with a document, e.g. metadata. Either an unmodified document or a modified document is delivered electronically to the document recipients 110 in step 510. In some exemplary embodiments, the intended document recipient 110 may require that the document be provided in a paper or other hardcopy format. In such cases, step 508 may result in the automatic generation of such a paper or other hardcopy format. In such instances, the document would not be delivered electronically in step 510 but instead may be delivered via mail, courier or other method of transporting paper or hardcopy documents.

In some exemplary embodiments, the intended document recipient 110 receives and processes the document in step 512 in order to take actions required as a result of what is contained in the document. For example, if the document requires that some action be taken with regard to an account at a financial institution, the document data may be processed and delivered to an automated account management function so that the necessary actions can be performed automatically.

While the present disclosure and associated concepts have been illustrated by the description of various embodiments thereof, and while these embodiments have been described in considerable detail, it is not the intention of the Applicant to restrict or in any way limit the scope of the disclosure to the specific embodiments described. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general disclosed concepts.

The invention claimed is:

1. A method for electronically distributing legal orders, the method comprising:
   receiving, by an order aggregation database, a plurality of orders from a source;
   receiving, by the order aggregation database, a selection that indicates that at least one of a plurality of receiving entities requires that at least one of the plurality of orders is received in a particular format suitable for effective service to the at least one of the plurality of receiving entities;
   aggregating, by the order aggregation database, the plurality of orders based on the selection of the at least one of the plurality of receiving entities;
   verifying, via the order aggregation database, by analyzing a unique digital signature that has been applied to each of the plurality of orders, that each of the plurality of orders has not been modified by an unauthorized party, wherein the unique digital signature has been applied at the source and the unique digital signature prevents modification of the plurality of orders;
   transmitting, by the order aggregation database, the aggregated orders to the at least one of the plurality of receiving entities; and
   receiving, by the order aggregation database, historical data relating to prior orders that are different from the plurality of orders,
   wherein the historical data is received as part of a receiving entity profile, and the method further includes:
   automatically updating, via the order aggregation database, the receiving entity profile based on changes in receiving entity information.

2. The method of claim 1, further comprising:
   converting, by the order aggregation database, the aggregated orders to a common format compatible with the at least one of the plurality of receiving entities.

3. The method of claim 1, wherein the plurality of receiving entities comprises at least a first receiving entity requiring a first order format and a second receiving entity requiring a second order format.

4. The method of claim 3, further comprising:
   converting, by the order aggregation database, the aggregated orders to a common format compatible with the first order format and the second order format.

5. The method of claim 1, further comprising:
verifying, by the order aggregation database, that at least one of the plurality of receiving entities received the order.

6. The method of claim 1, wherein non-public information has been redacted, by the source, from at least one of the plurality of orders.

7. The method of claim 1, further comprising:
receiving, by the order aggregation database, the historical data related to the prior orders transmitted to at least one of the plurality of receiving entities.

8. The method of claim 1, further comprising:
receiving, by the order aggregation database, at least one response to the aggregated order from the at least one of the plurality of receiving entities.

9. A system for electronically distributing legal orders, the system comprising:
an order aggregation database configured to:
receive a plurality of orders from a source;
receive a selection that indicates that at least one of a plurality of receiving entities requires that at least one of the plurality of orders is received in a particular format suitable for effective service to the at least one of the plurality of receiving entities;
aggregate the plurality of orders based on the selection of the at least one of the plurality of receiving entities;
verify, by analyzing a unique digital signature that has been applied to each of the plurality of orders, that each of the plurality of orders has not been modified by an unauthorized party, wherein the unique digital signature has been applied at the source and the unique digital signature prevents modification of the plurality of orders; and
transmit the aggregated orders to the at least one of the plurality of receiving entities,
wherein the order aggregation database is further configured to receive historical data relating to prior orders that are different from the plurality of orders,
wherein the historical data is received as part of a receiving entity profile, and
wherein the receiving entity profile is automatically updated based on changes in receiving entity information.

10. The system of claim 9, wherein the order aggregation database is further configured to:
convert the aggregated orders to a common format compatible with the least one of the plurality of receiving entities.

11. The system of claim 9, wherein the plurality of receiving entities comprises at least a first receiving entity requiring a first order format and a second receiving entity requiring a second order format.

12. The system of claim 11, wherein the order aggregation database is further configured to convert the order to a format compatible with the first order format and the second order format.

13. The system of claim 9, wherein the order aggregation database is further configured to verify that the at least one of the plurality of receiving entities received the order.

14. The system of claim 9, wherein non-public information has been redacted, by the source, from at least one of the plurality of orders.

15. The system of claim 9, wherein the aggregation of the plurality of orders is based on at least one aggregation factor.

16. A non-transitory computer readable medium configured to store instructions, such that when the instructions are executed by a processor, they cause the processor to perform the following:
receiving, by an order aggregation database, a plurality of orders from a source;
receiving, by the order aggregation database, a selection that indicates that at least one of a plurality of receiving entities requires that at least one of the plurality of orders is received in a particular format suitable for effective service to the at least one of the plurality of receiving entities;
aggregating, by the order aggregation database, the plurality of orders based on the selection of the at least one of the plurality of receiving entities;
verifying, via the order aggregation database, by analyzing a unique digital signature that has been applied to each of the plurality of orders, that each of the plurality of orders has not been modified by an unauthorized party, wherein the unique digital signature has been applied at the source and the unique digital signature prevents modification of the plurality of orders;
transmitting, by the order aggregation database, the aggregated orders to the at least one of the plurality of receiving entities; and
receiving, by the order aggregation database, historical data relating to prior orders that are different from the plurality of orders,
wherein the historical data is received as part of a receiving entity profile, and when the instructions are executed by the processor, they cause the processor to further perform the following:
automatically updating, via the order aggregation database, the receiving entity profile based on changes in receiving entity information.

17. The non-transitory computer readable medium of claim 16, wherein when the instructions are executed by the processor, they cause the processor to further perform the following:
converting, by the order aggregation database, the aggregated orders to a common format compatible with the at least one of the plurality of receiving entities.

18. The non-transitory computer readable medium of claim 16, wherein the plurality of receiving entities comprises at least a first receiving entity requiring a first order format and a second receiving entity requiring a second order format.

19. The non-transitory computer readable medium of claim 18, wherein when the instructions are executed by the processor, they cause the processor to further perform the following:
converting, by the order aggregation database, the aggregated orders to a common format compatible with the first order format and the second order format.

20. The non-transitory computer readable medium of claim 16, further comprising:
verifying, by the order aggregation database, that at least one of the plurality of receiving entities received the order.

* * * * *